Aug. 31, 1965     O. TSCHUDIN     3,204,133
ELECTRIC RECIPROCATING DRIVE WITH MOTION CONVERSION
Filed Jan. 29, 1963     3 Sheets-Sheet 1
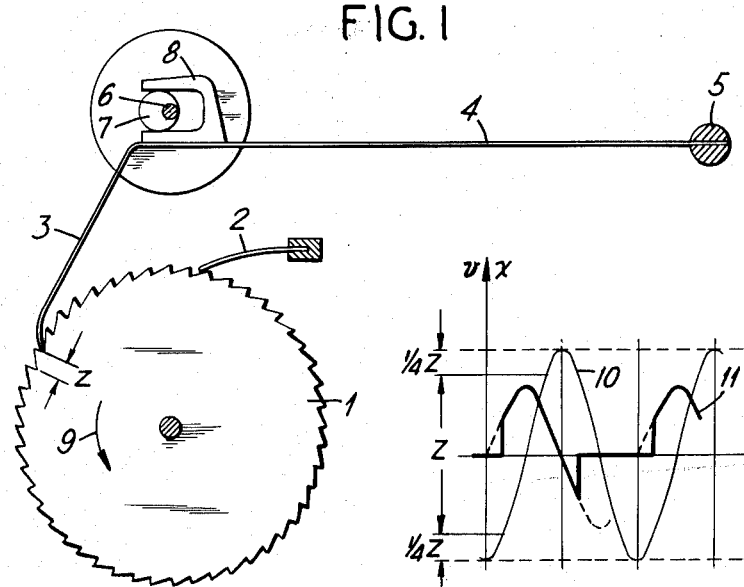
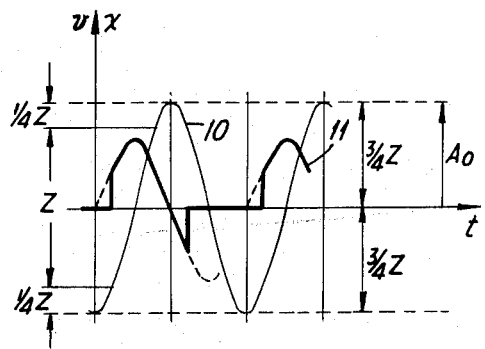
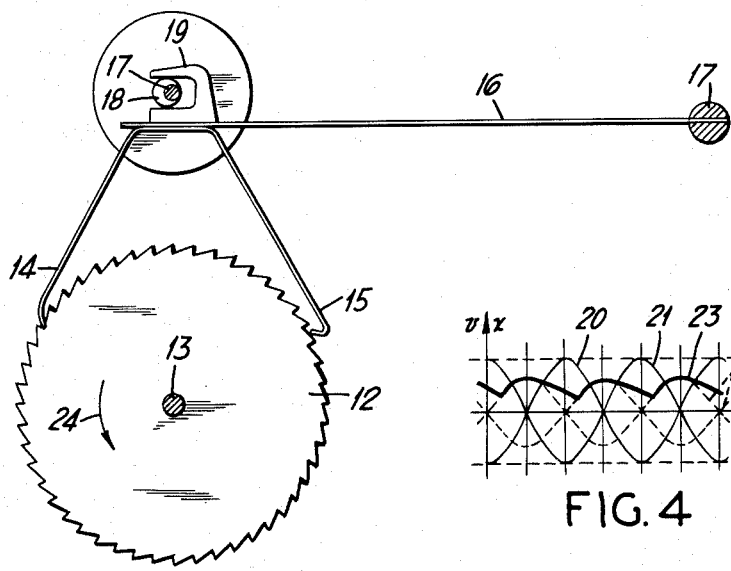
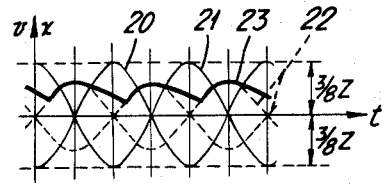
INVENTOR.
OSWALD TSCHUDIN
BY
*McGlew & Toren*
ATTORNEYS.

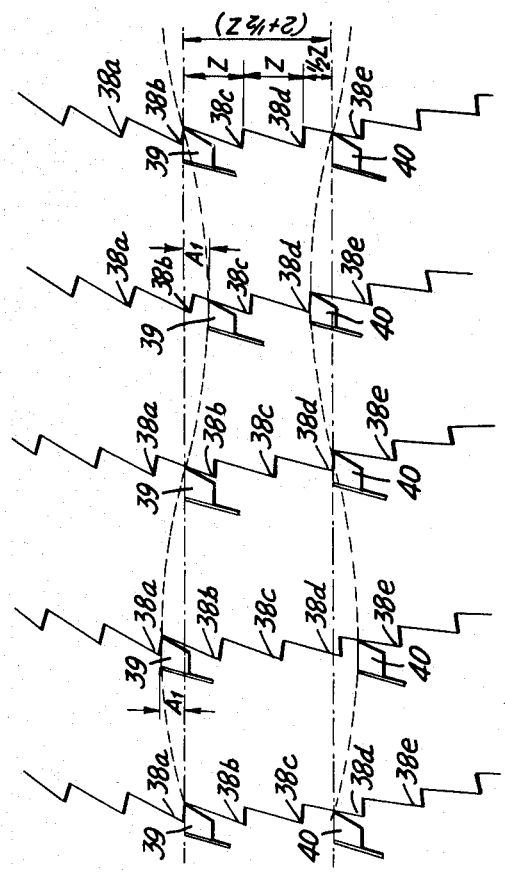
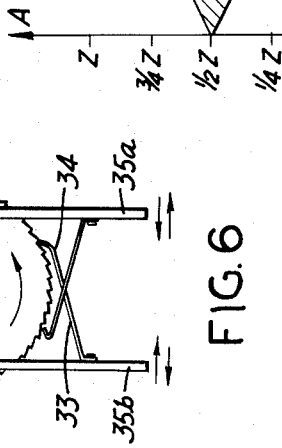
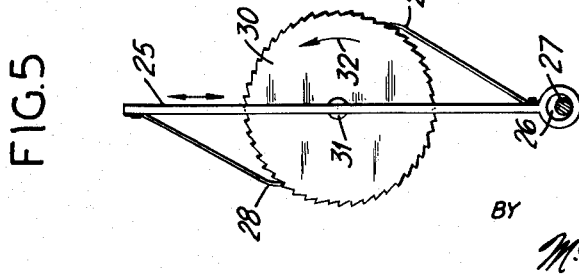

United States Patent Office 3,204,133
Patented Aug. 31, 1965

3,204,133
ELECTRIC RECIPROCATING DRIVE WITH MOTION CONVERSION
Oswald Tschudin, Oberdorf, Basel-Land, Switzerland, assignor to Institut Dr. Ing. Reinhard Straumann A.G., Waldenburg, Basel-Land, Switzerland, a Swiss firm
Filed Jan. 29, 1963, Ser. No. 254,673
Claims priority, application Switzerland, Jan. 31, 1962, 1,188/62
12 Claims. (Cl. 310—22)

This invention relates to means for converting oscillatory or reciprocatory motion into rotary motion and, more particularly, to an improved mechanical converter characterized by the provision of only two pawls and a single ratchet wheel acted on by the pawls, and by the absence of a braking means.

Oscillatory or reciprocatory motions are usually transformed into rotary motions by means of a crank mechanism. The crank mechanism effects one complete revolution of a rotary element for each complete oscillation or reciprocation of an oscillatory or reciprocatory element.

The particular field of application of the present invention is in precision mechanical movements wherein the transmission of power or output force or the attainment of a uniform velocity of movement, or both, are of less importance, but wherein an exact conversion is of importance. For example, the field may include counting procedures and straightening or rectification procedures.

Mechanical converters for converting oscillatory or reciprocatory motion into rotary motion are known. Where such a converter is driven by an eccentric, the eccentric together with the converter constitutes a gearing or transmission having a very large reduction. This has a substantial advantage over a gearing or transmission of the worm and worm wheel type because all of the axes are parallel to each other. It has the further characteristic that it is rectifying in that, independent of the direction of rotation of the eccentric, the ratchet wheel is always driven in the same direction.

Converters of this type are known wherein the converter embodies a pawl acting on a ratchet wheel and thus effective to rotate the ratchet wheel in one direction. Such known mechanism include a second and stationary pawl which does not move and merely serves to prevent reverse rotation of the ratchet wheel during the time the movable pawl is retracted.

In automatically wound watches, drives including two movable pawls are known for the purpose of transmitting power.

Further, in relatively large conversion apparatus, drives involving two short pawl levers are known for the purpose of exerting a very substantial torque on a ratchet wheel secured to a rotary shaft, and responsive to large oscillations or reciprocations of an armature. In these constructions, the pawls are for the purpose of transmitting power, and are accordingly articulated to the armature very close to the axis of rotation. Each pawl is biased by an associated spring against the ratchet wheel, and the two pawls are arranged one behind the other on the circumference of the ratchet wheel and drive the wheel alternately in the same direction. The switching mechanisms of certain electric clocks are of similar construction.

It is not possible to provide pawl drives of this type having very small dimensions as, even if the parts are made very small, a considerable space is still required.

In accordance with the present invention, a mechanical converter, for converting reciprocatory or oscillatory motion into rotary motion, is provided in a very compact form and particularly suitable for precision mechanisms. The mechanical converter of the invention has the outstanding feature that it comprises only two movable pawls and one ratchet wheel, and does not require any braking element or braking pawl. The two pawls are so connected with each other as to be conjointly movable, but, in relation to the teeth of the ratchet wheel, in opposite directions.

With a tooth division Z and a distance B between the two pawls in the rest position, the amplitude of pawl motion A is so chosen that:

$$\left(\tfrac{1}{2} - \left[\tfrac{\alpha}{z}\right]\right)Z < A < \left(\tfrac{1}{2} + \left[\tfrac{\alpha}{z}\right]\right)Z$$

$$B = (n+\alpha)Z$$

wherein $n=0$ or a whole number
and $$-\tfrac{1}{2} \leq \alpha \leq +\tfrac{1}{2}$$

The present invention has the advantage, as compared to a crank, that each oscillation or reciprocation effects a rotary or angular movement of the ratchet wheel through the distance of a pair of adjacent teeth.

The mechanical converter of the invention further has outstanding advantages with respect to known pawl and ratchet drives, particularly for pawl movement in the region of the frequency of sound. Thus, an outstanding advantage is that, with equal spacing of the teeth, the amplitude of movement of each pawl need be only one half as large as if only a single movable pawl were provided. An amplitude which is as small as possible is always desirable because of the technical difficulties increasing with increasing amplitude of movement, particularly where damping is of importance, since the required damping is increased with increasing amplitude. Furthermore, magnetostrictive materials and crystals can be used as pawl operators only if a very small amplitude of motion is required.

While all known pawl drives, as mentioned above, serve to transmit force, the mechanical converter of the present invention is designed to make possible a very large movement reduction in a single step or stage. Thus, pawl operating frequencies in the range of sound frequencies can be used.

For an understanding of the principles of the invention, reference is made to the following description of typical embodiments thereof as illustrated in the accompanying drawings.

In the drawings:

FIG. 1 is a somewhat schematic sectional view illustrating a prior art pawl and ratchet drive including a movable or operating pawl and a stationary or blocking pawl;

FIG. 2 is a graph illustrating the operation of the drive shown in FIG. 1;

FIG. 3 is a view, similar to FIG. 1, illustrating one embodiment of the present invention, and in which the pawls are mechanically operated;

FIG. 4 is a graph illustrating the operation of the embodiment of the invention shown in FIG. 1;

FIG. 5 is a somewhat schematic, part sectional, and part elevational view of an embodiment of the invention, serving as a reduction gear, and in which linear reciprocal motion is converted into a corresponding angular motion;

FIG. 6 is a somewhat schematic, part sectional and part elevation view of an embodiment of the invention in which oscillatory mechanical movement is converted into a corresponding angular movement;

FIGS. 7a–7e are greatly enlarged partial elevation views illustrating one complete cycle of the action of the two pawls upon the ratchet gear in accordance with the present invention;

FIG. 8 is a graphic representation of the ranges within which the amplitude of pawl movement has to be selected as a function of the spacing of the two pawls in the at rest position;

Figures 10, 11:
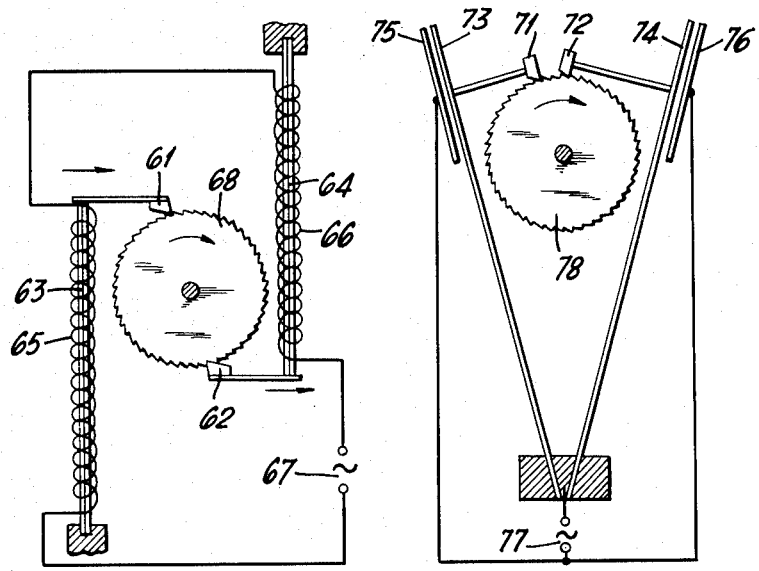

FIG. 10 is a somewhat schematic part sectional and part elevational view of a mechanical converter embodying the invention in which vibrations of magnetostrictive elements are converted into a corresponding angular displacement; and FIG. 11 is a somewhat schematic, part sectional and part elevation view of an embodiment of the invention in which cyclical variations in capacity are translated into a corresponding angular displacement.

The prior art pawl and ratchet drive shown in FIG. 1 comprises a ratchet wheel 1, stationary blocking pawl 2 and a movable or operating pawl 3. Pawl 3 is supported by a spring 4 fixed in a pin 5, and is oscillated or reciprocated by an eccentric 7 on a rotatable shaft 6 and engaged in a fork 8 rigidly or fixedly connected to the pawl 3. During oscillation or reciprocation of pawl 3, the pawl, in each downward movement, advances wheel 1 about the distance Z between a pair of adjacent teeth and in a counterclockwise direction, as indicated by the arrow 9. During upward movement of retraction of pawl 3, blocking pawl 2 prevents reverse rotation of wheel 1.

The oscillator or reciprocatory motion of the pawl 3 need not necessarily be effected by an eccentric arrangement as illustrated. Other means, such as an electromagnet, may be used. However, the characteristic feature of this known type of mechanical converter is that the ratchet wheel 1 is driven during only one half of the oscillatory motion of pawl 3 and, during the other half of such oscillatory motion, remains either stationary or moves in a reverse direction to a small extent as will be seen from a consideration of FIG. 2.

In FIG. 2, the curve 10 indicates the position of pawl 3 as a function of the time $t$. Since pawl 3, in the illustrated prior art arrangement, performs a sinusoidal oscillation and as, in other similar drives, a sinusoidal oscillation can be assumed, the curve 10 may be represented by the formula $$x = A_0 \cdot \sin \omega t$$

wherein $A_0$ meets the condition $$Z/2 < A_0 < 3Z/2$$

The distance between the two pawls in their rest position should be $(n+\frac{1}{2})Z$ wherein $n=0$ or is a whole number. The curve 11 indicates that ratchet wheel 1 is always stationary during about one half an oscillation, while it moves partly forwardly and partly rearwardly during the other half of the oscillation. That portion of curve 11 shown in dash lines illustrates the velocity $v$ of the pawl, while the full line portion of curve 11 indicates the velocity of $v$ of one tooth of wheel 1 as a function of time $t$.

In order for the drive shown in FIG. 1 to function properly, the ratchet wheel 1 must have a very small moment of inertia. This is necessary since, otherwise, reverse rotation of the wheel would be prevented only if, in advance of impact by pawl 3, the wheel 1 were already rotating, as otherwise there would arise the possibility of the pawl 3 jumping over teeth of wheel 1. Such conditions cannot be realized in practice, however, because during this advance both the operating pawl 3 and the blocking pawl 2 slide simultaneously over the teeth of wheel 1 and thus exert a braking effect. With a relatively small amplitude of motion of the pawl 3, reverse rotation of wheel 1 will always take place due to the drag of pawl 3 during its retraction.

The mechanical converter embodying the invention as shown in FIG. 3 includes a ratchet wheel 12 mounted on a shaft 13. The spacing Z between the adjacent teeth of wheel 12 is the same as that of the wheel 1 of FIG. 1, but wheel 12 has a very substantially large moment of inertia as compared to the moment of inertia of wheel 1. There are two operating pawls 14 and 15 secured to a spring 16 which is mounted in a pin 17, so that pawls 14 and 15 always move conjointly. However, in relation to the teeth of wheel 12, the pawls 14 and 15 move in opposed directions. The eccentricity of the eccentric 18 secured on shaft 17 is only one half that of the eccentricity of eccentric 7 on the shaft 6 of FIG. 1. Thus, the amplitude of motion A transmitted by fork 19 to spring 16 is smaller than the amplitude $A_0$ of the drive shown in FIG. 1. In the embodiment of FIG. 3, therefore:

$$Z/4 < A < 3Z/4$$

In the graph of FIG. 4, curve 20 illustrates the motion $x$ of pawl 14, while curve 21 illustrates the motion $x'$ of pawl 15, in both cases this being a function of time $t$ so that the following relations apply:

$$x = A \sin \omega t \text{ and}$$
$$x' = A \sin \omega t$$

The dash lines 22 of FIG. 4 indicate the velocity $v$ of the two pawls, while the heavy curve 23 indicates the velocity $v$ of the wheel 12 as a function of the time $t$. As will be noted, this latter velocity is not constant but its general form does not differ substantially from the velocity curve as shown in FIG. 2. However, the velocity of wheel 12 never assumes a negative value nor does if even assume the value 0. Wheel 12 thus turns with varying velocity but always in the same angular direction as indicated by the arrow 24.

As contrasted with the prior art arrangement of FIG. 1, the impact of a pawl on a tooth of the wheel 12 is much smaller since the amplitude of the pawl movement is only half as large as in FIG. 1. Thus, the pawl strikes the stationary tooth with only half the speed, and thus only a quarter of the impact. Since, however, between two succeeding impacts the pawl does not actually come to rest, the actual impact is still smaller, and this constitutes an important technical advantage.

While the ratchet wheel in known devices, such as shown in FIG. 1, has to be prevented from reverse rotation during return movement of the operating pawl, as by means of a blocking pawl, and this braking energy has an influence on the ratchet wheel during advance of the latter, the expenditure of energy with the drive of the invention is much smaller since much less energy has to be dissipated. In prior art arrangements, for this reason, the moment of inertia of the ratchet wheel has had to be very small in order to prevent there being too great braking forces.

In the present invention, on the other hand, large moments of inertia can be utilized. The moment of inertia of ratchet wheel 12 advantageously is chosen large enough that in the interval between driving by pawl 14 and driving by pawl 15, there will still be a time period during which the ratchet wheel will automatically advance in the prior direction without any pawl action. The invention drive, with the two pawl impacts on the wheel 12 during one complete oscillation of the eccentric 18, has the advantage that very small amplitudes of movement are sufficient or, with the same amplitude of movement, a greater spacing of the ratchet wheel teeth can be used.

Mechanical converters in accordance with the invention can be used as a component of means for making a rectified translation to a slower movement. They can also be used simply to convert an oscillatory or reciprocatory movement, such as the oscillation of an electrically excited oscillating reed or the like, into a rotary movement.

FIG. 5 illustrates an embodiment of the invention in which the mechanical converter is used as a reduction gearing. Reciprocation of a rod 25 is effected by an eccentric 26 secured on a shaft 27. Pawls 28 and 29 are mounted on rod 25, and are the only elements acting upon the ratchet wheel 30. Ratchet wheel 30 is secured on a shaft 31, which, independent of the direction of rotation of shaft 27, will always move in the direction of the arrow 32 with the velocity curve having a wave formation as shown in the graph of FIG. 4.

In the embodiments shown in FIGS. 3 and 5, the two operating pawls are mounted on a single carrier and in such a manner that their points of engagement with the ratchet wheel are substantially diametrically opposite each other. FIG. 6 illustrates an embodiment of the mechanical converter of the invention wherein two pawls 33 and 34 are mounted on respective arms $35a$ and $35b$ of an oscillatory element 35. The arms $35a$ and $35b$ swing toward and away from each other in such a manner that the points of engagement with the respective pawls 33 and 34 at the ratchet wheel 36 mounted on the shaft 37 are separated from each other by an angular distance of not in excess of 120°. The element 35 is a tuning fork which may be the oscillatory element of a tuning fork transmission wherein the oscillation is electronically maintained.

Figure 9:
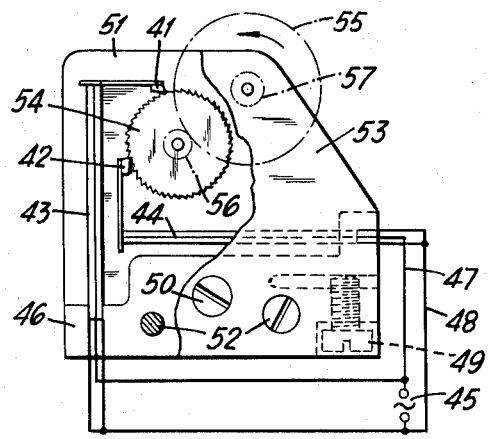
FIG. 9 is an elevation view, partly broken away and partly in section, illustrating a fourth embodiment of the invention mechanical converter in which vibrations of piezo-electric crystals are translated into a corresponding angular displacement.

Furthermore, it is not necessary that both pawls be arranged at the two free ends of the same mechanical oscillating or reciprocating element. Referring to FIG. 9, a pair of operating pawls 41 and 42 may each be secured to a respective piezo-electric crystal 43 or 44, or a corresponding respective rod of piezo-ceramic material. The crystals or the rods are connected, through conductors 47 and 48, with a common A.C. source 45.

Crystals 43 and 44 are fixed in a bearing member 46, and the position of crystal 44 can be adjusted by a screw 49. Bearing member 46 is secured by a screw 50 to a base plate 51, and additional screws 52 connect base plate 51 with a cover plate 53. A pair of gear wheels 54 and 55 are freely rotatably mounted between cover plate 53 and base plate 51. Gear wheel 54 is a ratchet wheel which is driven by pawls 41 and 42, and has secured to rotate therewith a pinion 56 meshing with gear wheel 55 which is coupled, for rotation therewith, to a drive take-off pinion 57. The small motor thus formed can be operated by alternating current or by pulse currents of any desired frequencies, which can be as low as 1 Hz.

In the embodiment of the mechanical converter of the invention as shown in FIG. 10, a pair of operating pawls 61 and 62 are secured to the free ends of respective bimetal oscillating elements 63 and 64 which are formed of magnetostrictive material. Only one end of each element 63 and 64 is fixedly mounted, and the elements are provided with respective exciter windings 65 and 66. Windings 65 and 66 are so connected to a common A.C. source 67 that pawls 61 and 62 will always be moved conjointly but, with respect to the teeth of ratchet wheel 68, in opposite directions.

In the mechanical converter embodying the invention as shown in FIG. 11, a pair of cooperating pawls 71 and 72 are secured to the free ends of respective oscillating reeds or tongues 73 and 74. Reeds or tongues 73 and 74 form, with plates 75 and 76, respectively, a pair of condensers. Plates 75 and 76 are connected to one terminal of an A.C. source 77 in such a manner that, due to the electrostatic action of the two condensers, pawls 71 and 72 can be made to oscillate to drive the ratchet wheel 78.

In the examples so far described, it has been assumed that the distance B between the two pawls at rest is $B=(n+\frac{1}{2})Z$, where Z is the tooth spacing of the ratchet wheel and $n=0$ or a whole number. FIGS. $7a$–$7e$ illustrate the operation in detail. The teeth of ratchet wheel 38 are indicated at $38a$, $38b$, $38c$, $38d$ and $38e$, and the two pawls at 39 and 40. The spacing of the pawls in their rest position amounts to $2.5Z$, as can be seen from FIGS. $7a$, $7c$ and $7e$.

When pawls 39 and 40 move from the rest position through an amplitude of $A=\frac{3}{8}Z$, then ratchet wheel 38 is turned by pawl 39 to such an extent that the wheel assumes the position shown in FIG. $7b$. If the pawls now approach each other again, pawl 40 engages the tooth $38d$ and rotates wheel 38 to the position shown in FIG. $7c$ and then into the position of FIG. $7d$ at which the pawls have their minimum spacing. The pawls thereafter move away from each other so that pawl 39 engages tooth $38b$ to again advance the gear wheel, and the operation is repeated.

As can be seen from FIGS. $7a$–$7e$, the distance B between the pawls at rest need not be exactly $(n+\frac{1}{2})Z$, but may be larger or smaller. The distance may assume the value $$B=(n+\alpha)Z$$

wherein $$-\frac{1}{2} \leq \alpha \leq +\frac{1}{2}$$

while, for an exact pawl spacing $$B=(n+\frac{1}{2})Z$$

amplitude A must be greater than $Z/4$ but less than $3Z/4$, the following relation applies for a variable pawl spacing:

$$B=(n+\alpha)Z$$

$$\left(\frac{1}{2}-\frac{\alpha}{z}Z\right) < A < \left(\frac{1}{2}+\frac{\alpha}{z}Z\right)$$

The respective range of values is indicated in FIG. 8 by cross-hatching between the limits of the values.

It will thus be seen that the range of amplitude A decreases with an increase in difference between the pawl distance B and the value $(n+\frac{1}{2})Z$, and that there is no amplitude when $\alpha=0$, which is when $B=n\times Z$.

It should be understood that, in the described embodiments and in the explanations, the mathematical representations of the limiting values apply in the event that the ratchet wheel never moves ahead of its driving pawls and is not drawn back by the retrograde motion of a pawl.

Practical experiments utilizing the mechanical converter of the invention completely confirm the correctness of these considerations. An increase in the axial dimension of the counting wheel or ratchet wheel, for increasing its moment of inertia, results in smaller specific tooth stresses. The ratchet wheel advances, during operation and after impact of a pawl, to a certain degree, and will not come to rest, as illustrated in the graph of FIG. 4. Experimental runs with the mechanical converter of the invention have been highly satisfactory and have resulted in operations over a frequency range of from 50 to 1000 periods per second. The dynamic conditions yield a stabilizing internal compensation, because a type of equilibrium condition is self adjusting.

While specific embodiments of the invention have been shown and described in detail to illustrate the application of the principles of the invention, it will be understood that the invention may be embodied otherwise without departing from such principles.

What is claimed is:

1. A mechanical converter, for converting oscillatory or reciprocatory motion into a continuously unidirectional motion, said mechanical converter comprising, in combination, a rotatably mounted ratchet wheel; a pair of pawls operatively associated with said wheel and comprising the only elements operable on said wheel; and oscillatory means conjointly operating said pawls in unison with each other but in opposite directions relative to the teeth of said wheel; the amplitude movement A of each pawl relative to the teeth of said wheel, with a tooth spacing Z and a distance B between the two pawls in the rest position, having a value such that $$\left(1/2-\left[\frac{\alpha}{z}\right]\right)Z < A < \left(1/2+\left[\frac{\alpha}{z}\right]\right)Z$$

$$B = (n+\alpha)Z$$

wherein $n=0$ or a whole number
and $$-\tfrac{1}{2} \leq \alpha \leq +\tfrac{1}{2}$$

said pawls acting in alternation and sequentially, during each cycle of oscillation of said oscillatory means, to advance said wheel by a distance equal to Z.

2. A mechanical converter as claimed in claim 1, wherein $$B = (n+\tfrac{1}{2})Z$$

and $$\tfrac{1}{4}Z < A < \tfrac{3}{4}Z$$

3. A mechanical converter, as claimed in claim 1, including a common carrier on which said pair of pawls is mounted; the points of contact of the pawls with said wheel being substantially diametrically opposite each other.

4. A mechanical converter, as claimed in claim 1, in which said oscillatory means comprises an oscillating element having a pair of arms movable toward and away from each other; each of said pawls being mounted upon a respective arm of said oscillating element; the points of engagement of the pawls with said wheel being spaced from each other by an amount not in excess of 120°.

5. A mechanical converter, as claimed in claim 1, wherein said oscillatory means comprises a pair of piezoelectric crystals; each of said pawls being mounted upon a respective crystal; and a source of A.C. potential commonly connected to both of said crystals.

6. A mechanical converter, as claimed in claim 1, in which said oscillatory means comprises a pair of magnetostrictive oscillatory elements; each of said pawls being mounted upon a respective one of said oscillatory magnetostrictive elements; a pair of exciter windings, each wound on a respective magnetostrictive oscillatory element; and a source of A.C. potential commonly connected to both of said exciter windings.

7. A mechanical converter, as claimed in claim 1, in which said oscillatory means includes a pair of vibratory reeds each having a corresponding end fixedly mounted; each reed constituting one electrode of a respective condenser; each of said pawls being mounted upon a free end of a respective reed; a pair of second electrodes each associated with a free end of a respective one of said reeds and constituting therewith a respective condenser; and a source of A.C. potential having one terminal connected commonly to both of said reeds and the other terminal connected in parallel to both of said second electrodes.

8. A mechanical converter, as claimed in claim 1, in the form of an electric motor; said ratchet wheel having an output pinion fixed thereto for rotation therewith; said oscillatory means including electrically excited oscillatory elements; and a source of electric potential having a periodic output function connected to said oscillatory elements in common.

9. A mechanical converter, as claimed in claim 8, wherein said source of electric potential is a source of A.C. potential.

10. A mechanical converter, as claimed in claim 8, in which said source of electric potential is a source of current pulses.

11. A mechanical converter, as claimed in claim 8, in which the frequency of said source is in excess of one cycle per sec.

12. A mechanical converter, as claimed in claim 1, said converter comprising a component of a reduction gearing.

References Cited by the Examiner

UNITED STATES PATENTS

| 1,881,884 | 10/32 | Noble | 74—143 X |
|---|---|---|---|
| 1,995,270 | 3/35 | Wallace | 58—23 |
| 2,942,486 | 6/60 | Beguin | 74—129 X |
| 3,020,425 | 2/62 | Steiner | 58/23 X |

FOREIGN PATENTS 579,298  7/24  France.

MILTON O. HIRSHFIELD, *Primary Examiner.*